(12) United States Patent
Yokoyama et al.

(10) Patent No.: US 11,301,031 B2
(45) Date of Patent: Apr. 12, 2022

(54) INFORMATION PROCESSING APPARATUS AND DISPLAY CONTROL METHOD TO CONTROL A DISPLAY POSITION OF A VIRTUAL OBJECT

(71) Applicant: SONY CORPORATION, Tokyo (JP)

(72) Inventors: Ryo Yokoyama, Tokyo (JP); Yusuke Nakagawa, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 666 days.

(21) Appl. No.: 16/087,394

(22) PCT Filed: Mar. 16, 2017

(86) PCT No.: PCT/JP2017/010598
§ 371 (c)(1),
(2) Date: Sep. 21, 2018

(87) PCT Pub. No.: WO2017/169827
PCT Pub. Date: Oct. 5, 2017

(65) Prior Publication Data
US 2021/0200301 A1    Jul. 1, 2021

(30) Foreign Application Priority Data

Mar. 31, 2016  (JP) .............................. JP2016-070142

(51) Int. Cl.
*G06F 3/01* (2006.01)
*G06T 3/20* (2006.01)
*G06T 11/00* (2006.01)

(52) U.S. Cl.
CPC ................ *G06F 3/011* (2013.01); *G06T 3/20* (2013.01); *G06T 11/00* (2013.01)

(58) Field of Classification Search
CPC .......... G06F 3/011; G06F 3/014; G06T 11/00; G06T 3/20; G06T 19/003
See application file for complete search history.

(56) References Cited

U.S. PATENT DOCUMENTS

| 2004/0236541 | A1 | 11/2004 | Kramer et al. |
| 2006/0277466 | A1 | 12/2006 | Anderson |
| 2012/0050162 | A1* | 3/2012 | Kakuta ............... G06F 3/04812 345/158 |

FOREIGN PATENT DOCUMENTS

| CN | 102314285 A | 1/2012 |
| CN | 104685869 A | 6/2015 |

(Continued)

OTHER PUBLICATIONS

International Search Report and Written Opinion of PCT Application No. PCT/JP2017/010598, dated Apr. 25, 2017, 6 pages of ISRWO.

(Continued)

*Primary Examiner* — Jeffery A Brier
(74) *Attorney, Agent, or Firm* — Chip Law Group

(57) ABSTRACT

An information processing apparatus that includes a display control unit that generates display information for controlling a display device to display a first virtual object defined in a virtual space, and a second virtual object different from the first virtual object, and a controller that controls the display device are provided. The controller controls, when determining that a reference position of the first virtual object is located inside the second virtual object, the display device to display the first virtual object at a position at which the first virtual object is externally tangent to the second virtual object, and controls, when determining that an operation to space the first virtual object away from the second virtual object is performed, a display position of the first virtual object such that the reference position and the display (Continued)

position of the first virtual object gradually become the same in association with the operation.

11 Claims, 13 Drawing Sheets

(56) References Cited

FOREIGN PATENT DOCUMENTS

| CN | 105159459 A | 12/2015 |
|---|---|---|
| JP | 2012-018559 A | 1/2012 |
| JP | 2014-072576 A | 4/2014 |
| JP | 2015-061616 A | 4/2015 |
| JP | 2016-197376 A | 11/2016 |
| WO | 2015/156068 A1 | 10/2015 |

OTHER PUBLICATIONS

Office Action for CN Patent Application No. 201780019351.9, dated Jul. 22, 2021, 8 pages of Office Action.

\* cited by examiner

INFORMATION PROCESSING APPARATUS AND DISPLAY CONTROL METHOD TO CONTROL A DISPLAY POSITION OF A VIRTUAL OBJECT

CROSS REFERENCE TO RELATED APPLICATIONS

This application is a U.S. National Phase of International Patent Application No. PCT/JP2017/010598 filed on Mar. 16, 2017, which claims priority benefit of Japanese Patent Application No. JP 2016-070142 filed in the Japan Patent Office on Mar. 31, 2016. Each of the above-referenced applications is hereby incorporated herein by reference in its entirety.

TECHNICAL FIELD

The present technology relates to an information processing apparatus, a display control method, and a program.

BACKGROUND ART

As a method for performing an operation associated with a basic physical action such as "have" and "touch" on a virtual object (hereinafter, referred to as "object") in a virtual space displayed on a display screen, the following method is known, for example.

A pointing object that performs such an operation on the object is displayed in the virtual space. This pointing object is moved in the virtual space in accordance with forward, rearward, leftward, and rightward motions of a user's hand that is detected by sensors. When the user clenches his/her hand to hold an object in the virtual space, that hand-clenching motion is detected by the sensors and a control unit, which receives the detected information, controls the pointing object to hold the object (e.g., see Patent Literature 1).

CITATION LIST

Patent Literature

Patent Literature 1: Japanese Patent Application Laid-open No. 2012-018559

DISCLOSURE OF INVENTION

Technical Problem

However, there are problems to be solved in various points, which are associated with the usability for the user with respect to the object in the virtual space.

In view of the above-mentioned circumstances, it is an object of the present technology to provide novel and improved information processing apparatus, information processing method, and program, which are capable of improving the usability with respect to the object in the virtual space.

Solution to Problem

In order to solve the above-mentioned problem, an information processing apparatus of an embodiment according to the present technology includes:

a display control unit that generates display information for controlling a display device to display a first virtual object defined in a virtual space, and
a second virtual object different from the first virtual object; and
a controller that is configured to
control the display device to move the first virtual object in the virtual space on the basis of a reference position based on an operation input of a user,
control, when determining that the reference position of the first virtual object is located inside the second virtual object, the display device to display the first virtual object at a position at which the first virtual object is externally tangent to the second virtual object, and
control, when determining that an operation to space the first virtual object away from the second virtual object is performed, a display position of the first virtual object such that the reference position and the display position of the first virtual object gradually become the same in association with the operation.

The controller may be configured to
calculate, on the basis of a movement vector of the reference position of the first virtual object and a difference vector between the reference position of the first virtual object and the display position of the first virtual object, an amount of control for updating the display position of the first virtual object, which is associated with the operation to space the first virtual object away from the second virtual object.

The first virtual object may include a plurality of first virtual objects.

The controller may be configured to
control, when the reference position of at least one first virtual object of the plurality of first virtual objects in the virtual space is located inside the second virtual object in a case where the plurality of first virtual objects are displayed in the virtual space on the basis of the reference position based on the operation input of the user, the display device to display the at least one first virtual object at a position at which the at least one first virtual object is externally tangent to the second virtual object under a restriction condition of a relative position relationship prescribed between the plurality of first virtual objects.

The controller may be configured to
control the display positions of the plurality of first virtual objects such that the reference position of the first virtual object and the display position of the first virtual object gradually become the same while following the restriction condition in association with an operation to space the plurality of first virtual objects away from the second virtual object.

The controller may be configured to
control, when determining the operation to move the first virtual object at a position inside the second virtual object, the display device to display the first virtual object at a position at which the first virtual object is externally tangent to the second virtual object in a movement process of the first virtual object.

The controller may be configured to
when determining that an operation to move the first virtual object to a first position inside the second virtual object from outside the second virtual object,
control the display device to display the first virtual object at a second position at which the first virtual object is externally tangent to the second virtual object in a process where the first virtual object is moved to the first position inside the second virtual object, determine a first normal direction with respect to an outline of the second virtual object to which the first virtual object displayed at the second position is externally tangent, determine a second normal direction with respect to the outline of the second virtual object, the second normal direction extending in the first normal direction from the first position, update the display position of the first virtual object to a third position at which the display position of the first virtual object is externally tangent to the outline of the second virtual object, the third position being located in the second normal direction extending from the first position, and repeat processing for updating the display position of the first virtual object until the processing for updating the display position of the first virtual object ends.

An information processing method of an embodiment according to the present technology includes:

generating, by a display control unit, display information for controlling a display device to display a first virtual object defined in a virtual space, and a second virtual object different from the first virtual object; and by a controller, controlling the display device to move the first virtual object in the virtual space on the basis of a reference position based on an operation input of a user, controlling, when determining that the reference position of the first virtual object is located inside the second virtual object, the display device to display the first virtual object at a position at which the first virtual object is externally tangent to the second virtual object, and controlling, when determining that an operation to space the first virtual object away from the second virtual object is performed, a display position of the first virtual object such that the reference position and the display position of the first virtual object gradually become the same in association with the operation.

A program of an embodiment according to the present technology causes a computer to operate as:

a display control unit that generates display information for controlling a display device to display a first virtual object defined in a virtual space, and a second virtual object different from the first virtual object; and a controller that is configured to control the display device to move the first virtual object in the virtual space on the basis of a reference position based on an operation input of a user, control, when determining that the reference position of the first virtual object is located inside the second virtual object, the display device to display the first virtual object at a position at which the first virtual object is externally tangent to the second virtual object, and control, when determining that an operation to space the first virtual object away from the second virtual object is performed, a display position of the first virtual object such that the reference position and the display position of the first virtual object gradually become the same in association with the operation.

Advantageous Effects of Invention

As described above, in accordance with the present technology, it is possible to provide a novel and improved information processing apparatus capable of improving the usability with respect to the object in the virtual space.

MODE(S) FOR CARRYING OUT THE INVENTION

Hereinafter, an embodiment according to the present technology will be described.

Descriptions of this embodiment will be given in the following order.

1. Outline
2. System Configuration
3. Configuration of Information Processing Apparatus 10
4. Display Control for Preventing Penetration of Operation Element 5. Display Control Part I Associated with Operation to Space Operation Element 3 away from Object 2

6. Display Control Part II Associated with Operation to Space Operation Element 3 away from Object 2

7. Determination Method for Operation to Space Operation Element 3 away from Object 2

8. Example of Calculation Method for Amount of Control on Operation Element 3

9. Display Control Part I for Preventing Penetration of Plurality of Operation Elements under Restriction Condition 10. Display Control Part II for Preventing Penetration of Plurality of Operation Elements under Restriction Condition First Embodiment

[1. Outline]

The technology of the present disclosure relates to an information processing system that performs an operation associated with a basic physical action such as "have" and "touch" on an object (second virtual object) that is a virtual object in a virtual space structured on a screen of a display device on the basis of information obtained by detecting a motion of user's finger(s) and the like. In this information processing system, information regarding motions of the user's hand(s) and/or finger(s) and the like is reflected on motions of an operation element (first virtual object) displayed as an object for operation in the virtual space.

This information processing system includes a display device, a motion-detecting device, and an information processing apparatus that performs various types of information processing related to display of the virtual space, such as virtual reality (VR) and augmented reality (AR), as basic configurations. The information processing apparatus only needs to be provided with a central processing unit (CPU) and a memory and include a controller capable of performing arithmetic processing by executing a program.

The motion-detecting device detects, with respect to an object that is a virtual object arranged in a virtual space on a screen of a display device, a motion of user's hand(s) and/or finger(s) aiming at an operation such as "have" and "touch", for example, and supplies the detected information to the information processing apparatus.

Figure 1:
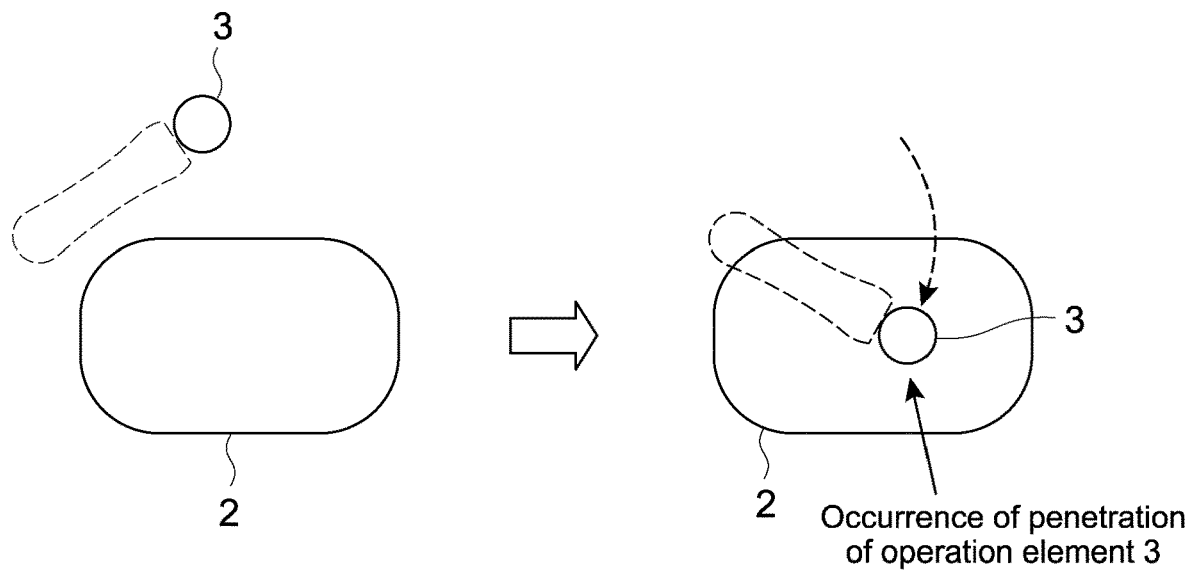
FIG. 1 A diagram for describing penetration of an operation element into an object in a virtual space.

(1) In accordance with a method in which a position of the operation element in the virtual space is calculated on the basis of detected information regarding a user's motion input by the motion-detecting device and the operation element is displayed at that calculated position, when a calculated position of an operation element 3 is located inside a space of an object 2 as shown in FIG. 1, for example, the operation element 3 appears to penetrate the object 2. When the operation element 3 is displayed inside the object 2 not considered to be soft, it is unnatural for an appearance of the operation such as "have" and "touch". In view of this, display control for preventing penetration of the operation element in which the display position of the operation element 3 is changed such that the operation element 3 does not penetrate the object 2 even if the calculated position of the operation element 3 is located inside the object 2 will be disclosed herein.

Note that, hereinafter, the position of the operation element in the virtual space which is calculated on the basis of the detected information of the user's motion which is input by the motion-detecting device will be referred to as a "calculation position of the operation element" and the position of the operation element displayed in the virtual space will be referred to as a "display position of the operation element". The calculation position of the operation element corresponds to the "reference position based on the operation input of the user" in the scope of claims and the display position of the operation element corresponds to the "display position of the first virtual object" in the scope of claims.

(2) In addition, in a case where the display control for preventing penetration of the operation element is employed, even if an operation to move the operation element 3 outside the object 2 from inside is performed, the calculation position of the operation element 3 is located inside the object 2 for a while thereafter. Therefore, there is a delay time until the operation element 3 appears to start to move, which deteriorates visual responsiveness. In view of this, display control capable of naturally giving a response to a user from the operation element 3 when an operation to space the operation element 3 away from the object 2 is performed will be disclosed herein.

[2. System Configuration]

Figure 2:
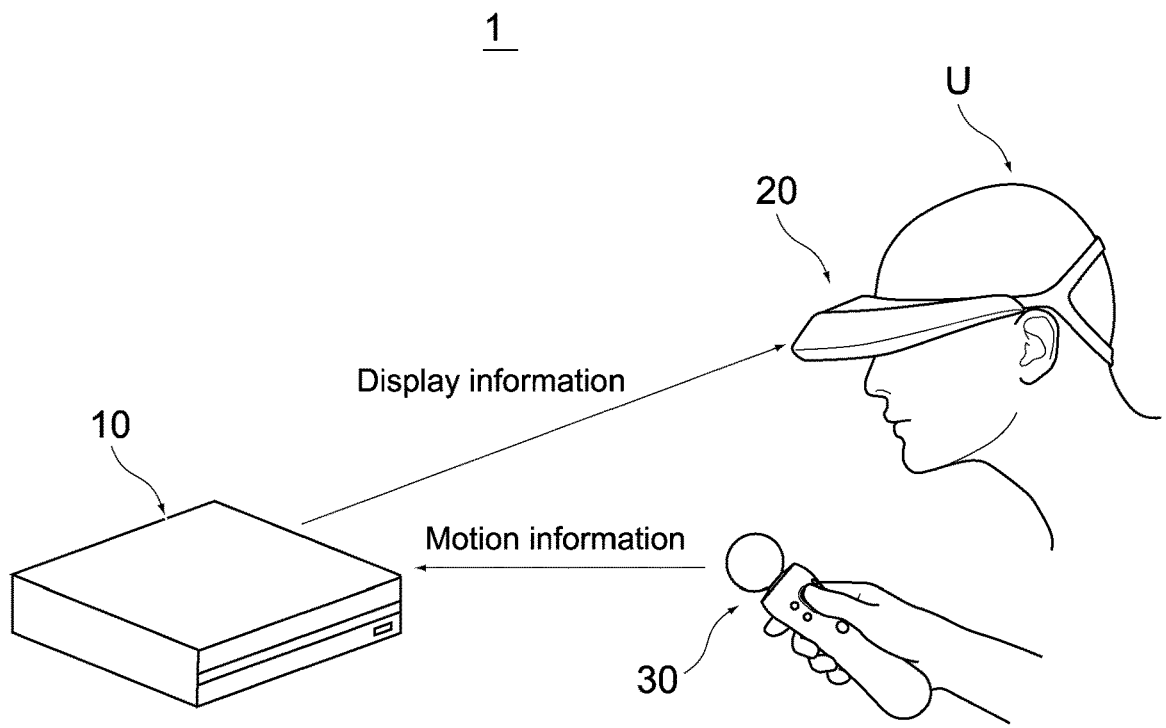
FIG. 2 A block diagram showing an example of a configuration of an information processing system 1 of a first embodiment according to the present technology.

FIG. 2 is a block diagram showing an example of a configuration of an information processing system 1 of a first embodiment according to the present technology.

This information processing system 1 includes an information processing apparatus 10, a display device 20, and a motion-detecting device 30. The information processing apparatus 10 is capable of wirelessly or wiredly communicating with the display device 20. The information processing apparatus 10 is capable of wirelessly or wiredly communicating with the motion-detecting device 30. Wireless communication is desirably used for each communication. For example, an arbitrary wireless communication method such as a wireless local area network (LAN), Bluetooth (registered trademark), Wi-Fi (registered trademark), and Zigbee (registered trademark) is applicable for the wireless communication.

The display device 20 may be, for example, a stationary display, a monitor, a 3D display, or a wearable display such as a head-mounted display (HMD) and a bracelet type display which is independent from the information processing apparatus 10. Further, one including the information processing apparatus 10 and the display device 20 which are integrated with each other, such as a laptop PC, a tablet terminal, and a smart phone may be employed. Alternatively, the information processing apparatus 10 may be incorporated in a wearable display such as a head-mounted display (HMD) and a bracelet type display.

The motion-detecting device 30 only needs to be capable of detecting motions of a hand and fingers of a user U, for example. Examples of the motion-detecting device 30 can include a stick type device equipped with a motion sensor and a glove type device capable of detecting positions of joints of the back and fingers of the user's hand and the like. Alternatively, one or more cameras may take images of the user's hand(s) and/or finger(s) and motions of the user's hand(s) and/or finger(s) and the like may be detected by image recognition.

[3. Configuration of Information Processing Apparatus 10]

Figure 3:
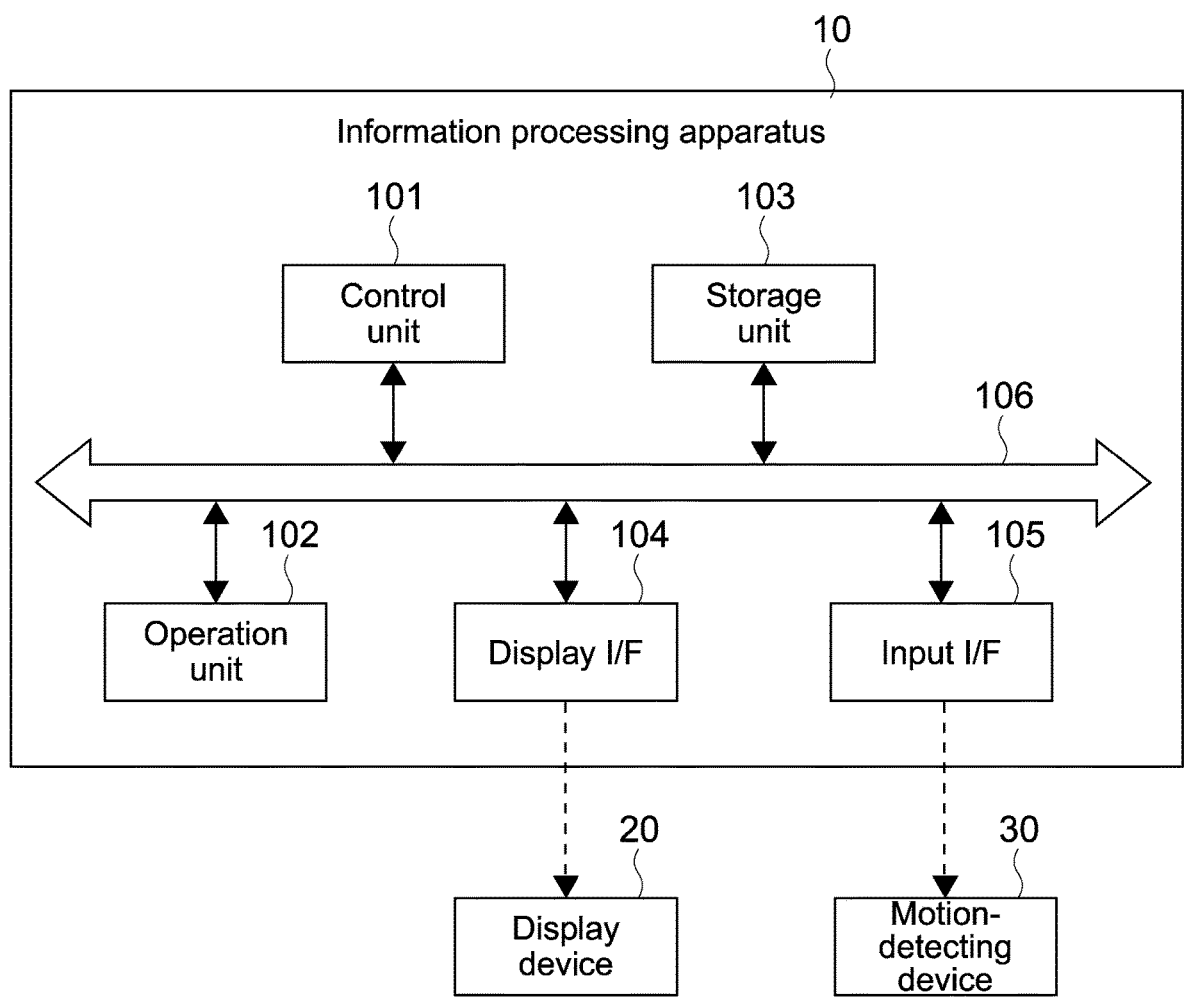
FIG. 3 A block diagram showing a hardware configuration of an information processing apparatus 10 that belongs to the information processing system 1 of FIG. 2.

FIG. 3 is a block diagram showing a hardware configuration of the information processing apparatus 10 belonging to the above-mentioned information processing system 1.

As shown in the figure, the information processing apparatus 10 includes a control unit 101, an operation unit 102, a storage unit 103, a display interface 104 with the display device 20, an input interface 105 with the motion-detecting device 30, and a bus 106.

The control unit 101 corresponds to "controller" in claims according to the present technology and includes a processor such as a central processing unit (CPU) and a digital signal processor (DSP) and a main memory including a random access memory (RAM) and the like. The control unit 101 executes a program by using the main memory as a work area and performs information processing related to the display of the virtual space such as the VR. Further, the control unit 101 sends and receives information to/from the operation unit 102, the storage unit 103, the display interface 104, and the input interface 105 via the bus 106.

The operation unit 102 is a user interface for receiving various types of user's inputs into the information processing apparatus 10. The operation unit 102 only needs to be capable of receiving user's inputs. The operation unit 102 includes, for example, a keyboard, a mouse, a button, a switch, a key pad, a controller for a game console, a microphone (audio input), and the like.

The storage unit 103 includes, for example, a storage medium such as a semiconductor memory and a hard disk. Programs and data necessary for processing related to the display of the virtual space such as the VR are stored in the storage unit 103. Note that at least part of the programs and data may be, for example, acquired from storage outside the information processing apparatus 10, such as a data server, network storage, and an external recording apparatus rather than being stored by the storage unit 103.

The display interface 104 is an interface for sending display data for the display of the virtual space generated by the control unit 101 to the display device 20 in accordance with a wireless communication method or a wired communication method.

The input interface 105 is an interface for receiving user's motion information from the motion-detecting device 30 in accordance with a wireless communication method or a wired communication method. The input interface 105 corresponds to a "display control unit" in the scope of claims.

The bus 106 is a transmission channel to be used for information transmission among the control unit 101, the operation unit 102, the storage unit 103, the display interface 104, and the input interface 105.

[4. Display Control for Preventing Penetration of Operation Element]

On the basis of a program, the control unit 101 of the information processing apparatus 10 generates display data of the virtual space including the object 2 that is a virtual object that is operated and the operation element 3 that operates it. The control unit 101 calculates a position of the operation element 3 in the virtual space on the basis of user's motion information input from the motion-detecting device 30 through the interface 105 and performs control to display the operation element 3 at that position.

As shown in FIG. 1, the calculation position of the operation element 3 is located inside the space of the object 2, and thus when the operation element 3 is displayed at that position without change, the operation element 3 appears to penetrate the object 2, which is unnatural. In view of this, in the information processing apparatus 10 of this embodiment, in a case where the calculation position of the operation element 3 is located inside the space of the object 2, the display control for preventing penetration in which the display position of the operation element 3 is changed such that the operation element 3 does not penetrate the object 2 is performed.

Figure 4:
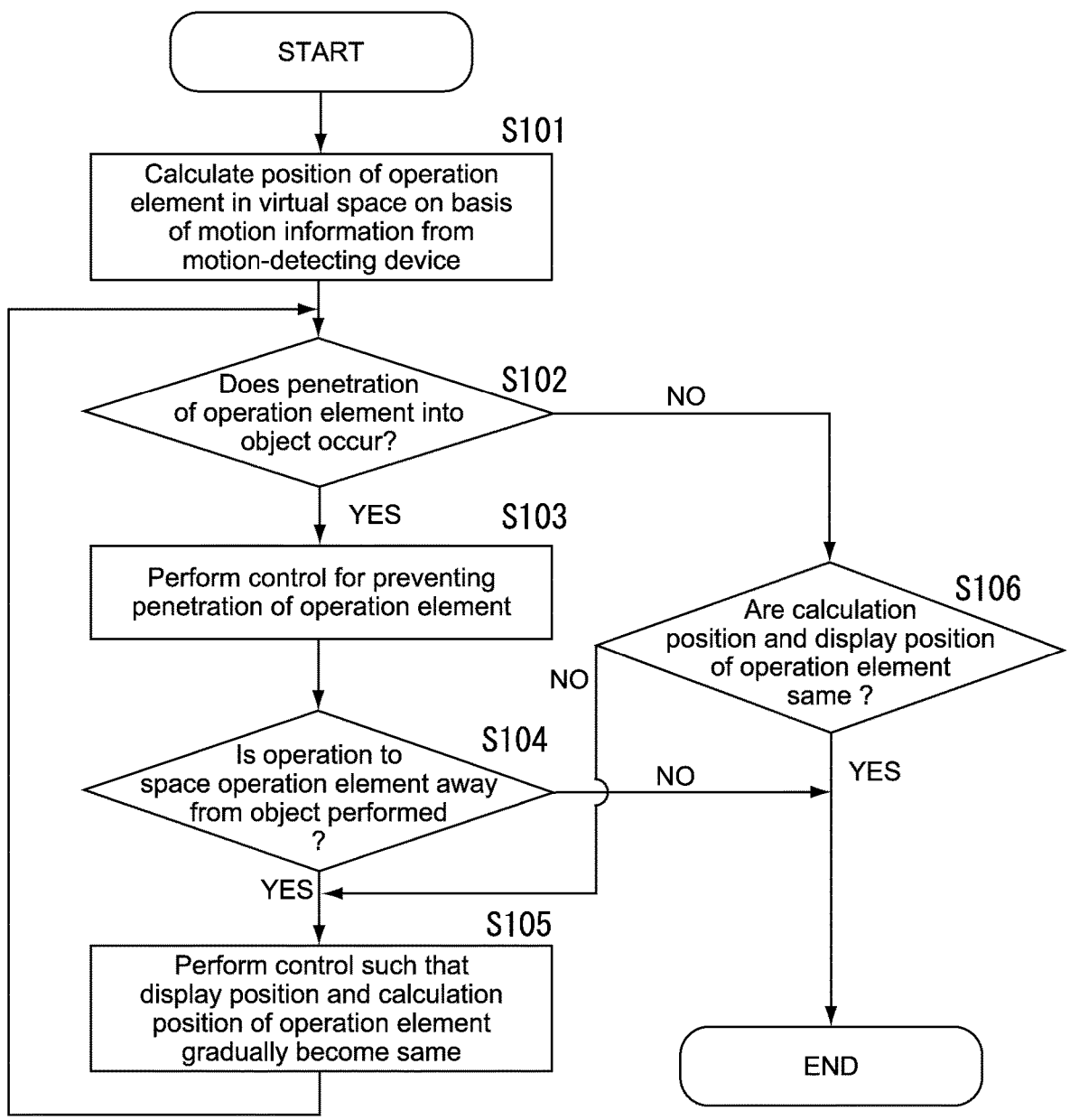
FIG. 4 A flowchart regarding display control for an operation element 3 at the information processing apparatus 10 of FIG. 3.

FIG. 4 is a flowchart showing a procedure of the display control for preventing penetration of the operation element 3 and display control in the operation to space the operation element 3 away from the object 2, which will be described later.

The control unit 101 of the information processing apparatus 10 calculates a position of the operation element 3 in the virtual space on the basis of motion information acquired from the motion-detecting device 30 (Step S101). The control unit 101 calculates two positions P0 and P1 on the basis of motion information temporally continuously acquired from the motion-detecting device 30 and determines whether or not the operation element 3 penetrates the space of the object 2 on the basis of calculation (Step S102).

Here, in a case where at least the calculation position P1 of the operation element 3 (hereinafter, referred to as "first position P1") is located inside the object 2, the control unit 101 determines that the operation element 3 penetrates the space of the object 2 on the basis of calculation (YES in Step S102). Then, the control unit 101 starts the control for preventing penetration of the display position of the operation element 3 (Step S103).

Figure 5:
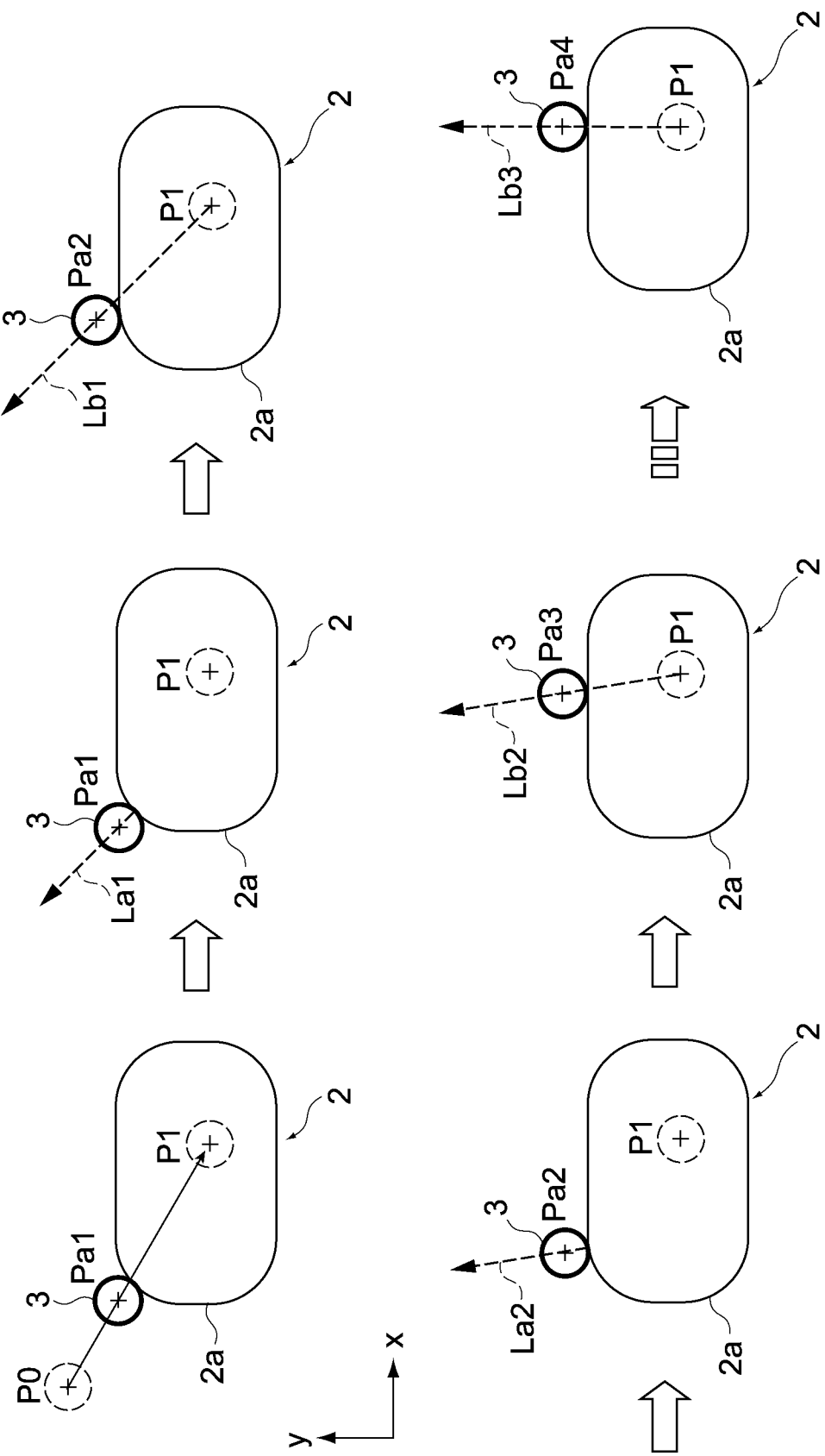
FIG. 5 A diagram for describing the display control for preventing penetration of the operation element 3 at the information processing apparatus 10 of FIG. 3.

FIG. 5 is a diagram for describing the display control for preventing penetration of the operation element 3.

Note that in this description, it is assumed that a stick-type device is used as the motion-detecting device 30. In this case, the number of operation elements 3 is "1". The shape of the object 2 in the virtual space is not particularly prescribed. It should be noted that in this description, it is assumed that the object 2 has a shape having two sides which extend in an x-axis direction, are parallel to each other, and are at both ends thereof connected to each other through curves.

As the control for preventing penetration of the operation element 3, the control unit 101 first displays the operation element 3 at a second position Pa1 at which the calculation position of the operation element 3 is externally tangent to the object 2 in a process where the calculation position of the operation element 3 moves from the position P0 outside the object 2 to the first position P1 inside the object 2.

Next, the control unit 101 determines a first normal direction La1 with respect to an outline 2a of the object 2, which extends in the direction of the second position Pa1 as viewed from the first position P1.

Next, the control unit 101 determines a second normal direction Lb1 with respect to the outline 2a of the object 2, which extends in the first normal direction La1 from the first position P1.

Subsequently, the control unit 101 updates the display position of the operation element 3 to a third position Pa2 at which the calculation position of the operation element 3 is externally tangent to the outline 2a of the object 2, which is located in the second normal direction Lb1 extending from the first position P1.

By repeating similar processing also thereafter, the control unit 101 moves the display position of the operation element 3 along the outline 2a of the object 2 in the order of a fourth position Pa3 and a fifth position Pa4. In this example, a normal direction Lb3 with respect to the outline 2a of the object 2, which extends in a direction of the fifth position Pa4 as viewed from the first position P1, is parallel to a y-axis direction. Therefore, at this fifth position Pa4, the processing of updating the display position of the operation element 3 ends.

Note that the reason why the update processing of the display position of the operation element 3 ends at this timing is that the normal direction Lb3 with respect to the outline 2a of the object 2, which extends in the direction of the fifth position Pa4 as viewed from the first position P1, is parallel to the y-axis direction in this example. Thus, if the normal direction Lb3 is not parallel to the y-axis direction, the update processing is continued.

When the calculation position of the operation element 3 in the virtual space is changed on the basis of the motion information acquired from the motion-detecting device 30, the control unit 101 re-starts the display control for preventing penetration of the operation element 3 and the display position of the operation element 3 is updated again.

In this manner, in the display control for preventing penetration of the operation element 3 according to the technology of the present disclosure, when the calculation position of the operation element 3 moves to the arbitrary first position P1 inside the object 2, the display position of the operation element 3 continuously moves from the second position Pa1 at which the display position of the operation element 3 is first externally tangent to the object 2 along the outline 2a of the object 2 so as to gradually approach the position directly above the first position P1 inside the object 2 in that movement process. Accordingly, discomfort to the user can be alleviated in comparison with control to only immovably display the operation element 3 at the second position Pa1 at which the operation element 3 is first externally tangent to the object 2 in a process where the calculation position of the operation element 3 moves the arbitrary first position P1 inside the object 2, for example.

When the control to display the operation element 3 at the position at which the operation element 3 is externally tangent to the object 2 is performed in a case where the operation to move the operation element 3 inside the object 2 from outside is performed as represented by the display control for preventing penetration of the operation element according to the technology of the present disclosure and the like, the following problem occurs.

In a case where the operation to space the operation element 3 away from the object 2 is performed, the operation element 3 remains displayed at the position at which the operation element 3 is externally tangent to (the outline 2a of) the object 2 until the calculation position of the operation element 3 moves outside the object 2. Therefore, it can make the user feel like the speed of response to the operation to space the operation element 3 away from the object 2 is low.

In order to solve this problem, as also shown in the flowchart of FIG. 4, if the operation to space the operation element 3 away from the object 2 is performed (YES in Step S104), the control unit 101 controls the display position of the operation element 3 such that the calculation position of the operation element 3 and the display position of the operation element 3 gradually become the same in association with that operation (Steps S105 and S106).

Hereinafter, this display control associated with the operation to space the operation element 3 away from the object 2 will be described in detail.

[5. Display Control Part I Associated with Operation to Space Operation Element 3 away from Object 2]

Figure 6:
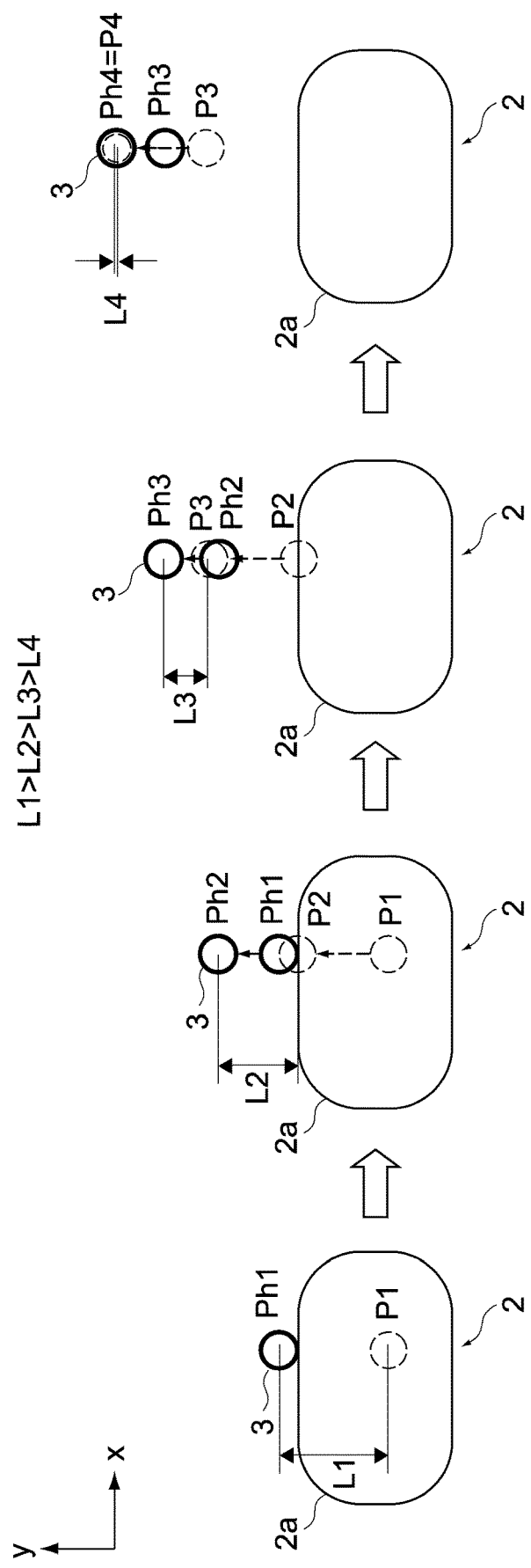
FIG. 6 A diagram for describing display control Part I associated with an operation to space the operation element 3 away from an object 2.

FIG. 6 is a diagram for describing this display control Part I associated with the operation to space the operation element 3 away from the object 2.

First of all, it is assumed that although the calculation position P1 of the operation element 3 is located inside the object 2, the operation element 3 is displayed at a position Ph1 at which the operation element 3 is externally tangent to the object 2 due to the above-mentioned display control for preventing penetration of the operation element, for example. Note that in this example, this display position Ph1 of the operation element 3 is a display position at which the operation element 3 finally arrives due to the above-mentioned display control for preventing penetration and corresponds to the fifth position Pa4 of FIG. 5.

Thereafter, the operation to space the operation element 3 away from the object 2 is performed, and the control unit 101 determines that that operation is performed. Note that a determination method for this operation to space the operation element 3 away from the object 2 will be described later.

When determining that the operation to space the operation element 3 away from the object 2 is performed, the control unit 101 calculates a display position of the operation element 3 in an external space of the object 2 such that the calculation position of the operation element 3 and the display position of the operation element 3 gradually become the same. That is, in FIG. 6, when the calculation position of the operation element 3 is updated from P1 to P2, the control unit 101 updates the display position of the operation element 3 from Ph1 which is a position at which the display position of the operation element 3 is externally tangent to the object 2 to a position Ph2 spaced apart from the object 2.

Next, when the calculation position of the operation element 3 is updated from P2 to P3, the control unit 101 updates the display position of the operation element 3 from Ph2 to Ph3. This example shows a case where, when the calculation position of the operation element 3 is further updated from P3 to P4, the display position of the operation element 3 is updated from Ph3 to Ph4 which is the same position or approximately the same position as the calculation position P4 of the operation element 3.

Here, provided that a distance between P2 and Ph2 is L1, a distance between P3 and Ph3 is L2, a distance between P4 and Ph4 is L3, and a distance between P4 and Ph4 is L4, L1>L2>L3>L4 is established.

An amount of control for updating the display position of the operation element 3 can be calculated on the basis of, for example, a movement vector between the calculation positions before and after the movement of the operation element 3 and a difference vector between the display position and the calculation position of the operation element 3.

[6. Display Control Part II Associated with Operation to Space Operation Element 3 away from Object 2]

In the above-mentioned display control Part I, the fact that, regarding the display position Ph1 of the operation element 3 and the calculation position P1 of the operation element 3 just before the operation to space the operation element 3 away from the object 2 is performed, the positions on the x-axis are the same as each other and the positions on the y-axis are not the same as each other is used as a premise. However, the display control for the operation element 3 according to the technology of the present disclosure is also effective in a case where the display position Ph1 of the operation element 3 and the calculation position P1 of the operation element 3 just before the operation to space the operation element 3 away from the object 2 is performed are different in the x- and y-axis directions. Next, display control in this case will be described as display control Part II associated with the operation to space the operation element 3 away from the object 2.

Figure 7:
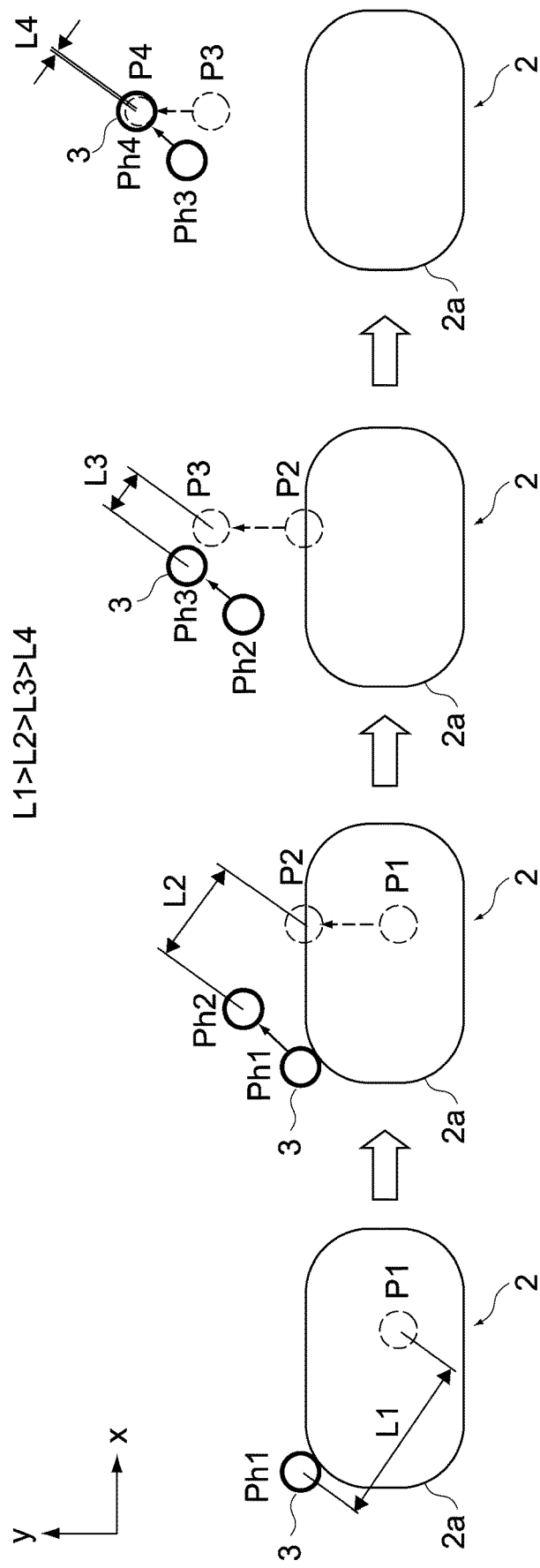
FIG. 7 A diagram for describing display control Part II associated with the operation to space the operation element 3 away from the object 2.

FIG. 7 is a diagram for describing the display control Part II associated with the operation to space the operation element 3 away from the object 2.

Here, it is assumed that a method of fixedly displaying the operation element 3 at the position Ph1 when the operation element 3 is first externally tangent to the object 2 in a process where the calculation position of the operation element 3 moves to the arbitrary position P1 inside the object 2 is employed as the display control for preventing penetration.

Also in this display control Part II, when determining that the operation to space the operation element 3 away from the object 2 is performed, the control unit 101 calculates a display position of the operation element 3 in the external space of the object 2 such that the calculation position of the operation element 3 and the display position of the operation element 3 gradually become the same, as in the above-mentioned display control Part I. That is, in FIG. 7, when the calculation position of the operation element 3 is updated from P1 to P2, the control unit 101 updates the display position of the operation element 3 from Ph1 which is a position at which the display position of the operation element 3 is externally tangent to the object 2 to the position Ph2 spaced apart from the object 2.

Next, the calculation position of the operation element 3 is updated from P2 to P3, the control unit 101 updates the display position of the operation element 3 from Ph2 to Ph3.

This example shows a case where, when the calculation position of the operation element 3 is further updated from P3 to P4, the display position of the operation element 3 is updated from Ph3 to Ph4 which is the same position or approximately the same position as P4.

Here, provided that a distance between P2 and Ph2 is L1, a distance between P3 and Ph3 is L2, a distance between P4 and Ph4 is L3, and a distance between P4 and Ph4 is L4, L1>L2>L3>L4 is established.

Also in this display control Part II, the amount of control for updating the display position of the operation element 3 can be calculated on the basis of, for example, a movement vector between the calculation positions before and after the movement of the operation element 3 and a difference vector between the display position and the calculation position of the operation element 3 as in the display control Part I.

In this manner, in accordance with the display control associated with the operation to space the operation element 3 away from the object 2 according to the technology of the present disclosure, the display position of the operation element 3 is updated such that the calculation position of the operation element 3 and the display position of the operation element 3 gradually become the same in association with the operation to space the operation element 3 away from the object 2. Therefore, the visual responsiveness to the operation to space the operation element 3 away from the object 2 is improved.

[7. Determination Method for Operation to Space Operation Element 3 away from Object 2]

Figure 8:
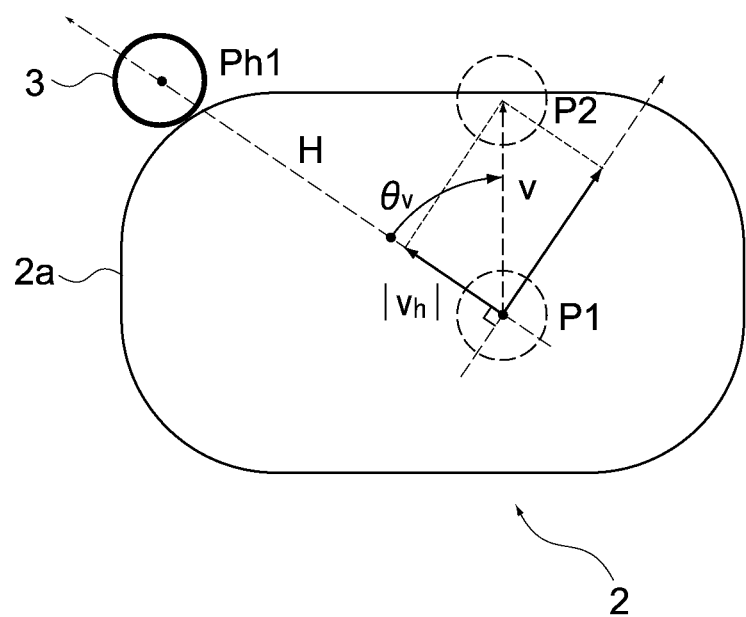
FIG. 8 A diagram for describing an example of a determination method for the operation to space the operation element 3 away from the object 2.

FIG. 8 is a diagram for describing an example of the determination method for the operation to space the operation element 3 away from the object 2 by using the case of the above-mentioned display control Part II as an example.

In the figure, a straight line H connecting the center of the display position Ph1 when the operation element 3 is first externally tangent to the object 2 in a process where the calculation position of the operation element 3 moves to the arbitrary position P1 inside the object 2 to the center of the calculation position P1 of the operation element 3 will be referred to as an "operation-element penetration axis H". The vee (v) is the movement vector of the calculation position of the operation element 3 due to the operation to space the operation element 3 away from the object 2. An angle of this movement vector v to the operation-element penetration axis H is denoted by $\theta_v$ and magnitude of the movement vector v in the direction of the operation-element penetration axis H is denoted by $v_h$.

Expression (1) below shows a determination condition for the operation by which the operation element 3 is spaced away from the object 2.

$$|\theta_v| < T\theta_v \text{ and } Tv_h < |v_h| \qquad (1)$$

Where $T\theta_v$ and $Tv_h$ are respectively thresholds.

In this manner, the determination condition for the operation by which the operation element 3 is spaced away from the object 2 is prescribed. Thus, it is possible to cancel little motions of the operation element 3 due to hand vibrations and the like and to determine the operation by which the operation element 3 is spaced away from the object 2 by using the direction in which the calculation position of the operation element 3 enters the object 2 as a reference. Accordingly, the operation by which the operation element 3 is spaced away from the object 2 can be more suitably determined.

Note that the determination method for the operation to space the operation element 3 away from the object 2 is not limited to the above-mentioned one. Various other methods and modifications are conceivable.

[8. Example of Calculation Method for Amount of Control on Operation Element 3]

Figure 17:
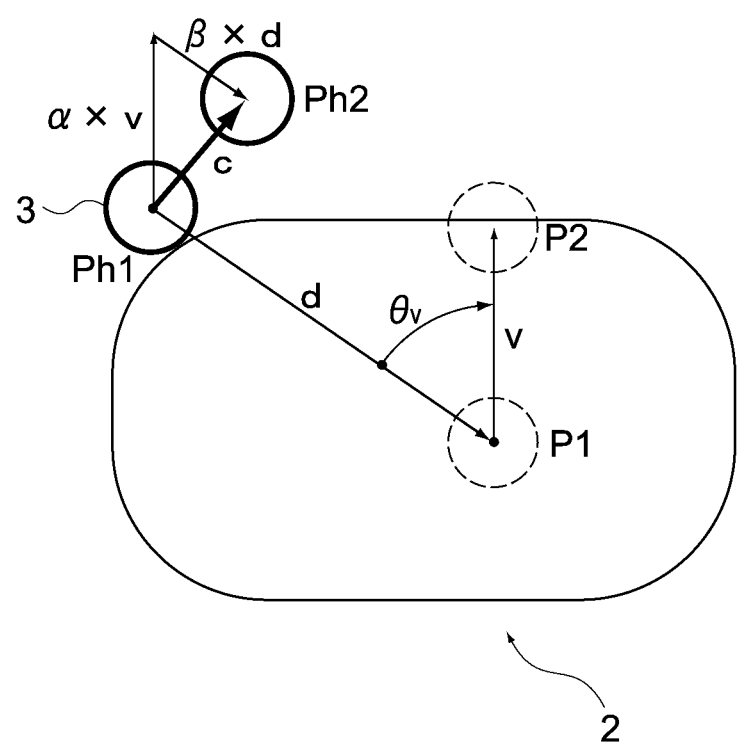
FIG. 17 A diagram for describing a method of calculating an amount of control on the operation element 3 which is associated with the operation to space the operation element 3 away from the object 2.

Next, an example of a method of calculating an amount of control on the operation element 3, which is associated with the operation to space the operation element 3 away from the object 2, on the basis of the movement vector between the calculation positions before and after the movement of the operation element 3 and the difference vector between the display position and the calculation position of the operation element 3 will be described with reference to FIG. 17.

The control unit 101 calculates a control vector c that is the amount of control on the operation element 3 in accordance with Expression (2) below.

$$c = (\alpha \times v) + (\beta \times d) \qquad (2)$$

Where v is the movement vector and d is the difference vector. Alpha ($\alpha$) and beta ($\beta$) are control parameters, take values equal to or larger than 0 and equal to or smaller than 1, for example, and are values depending on magnitude $|v|$ of the movement vector v or magnitude $|\theta_v|$ of the angle.

An example of the control parameter $\beta$ depending on the magnitude $|v|$ of the movement vector v is as below.

$$\beta = e^{-\gamma/|v|} \text{ ($\gamma$ is a constant)}$$

$$\beta = 1 - e^{-\gamma/|v|} \text{ ($\gamma$ is a constant)}$$

Second Embodiment

Next, display control for preventing penetration in a case where a plurality of operation elements, which imitate the forms of the user's hand and fingers displayed in the virtual space and are connected to each other, will be described as a second embodiment of the display control for preventing penetration of the operation element according to the technology of the present disclosure.

Figure 9:
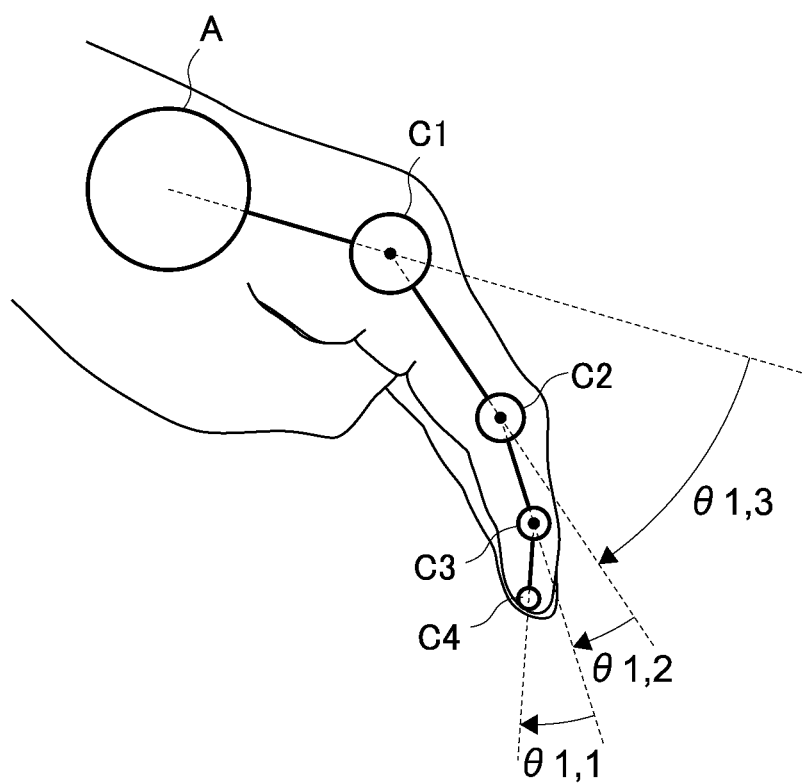
FIG. 9 A diagram for describing bends of joints of a user's finger, which can be detected by a motion-detecting device of a glove type.
Figure 10:
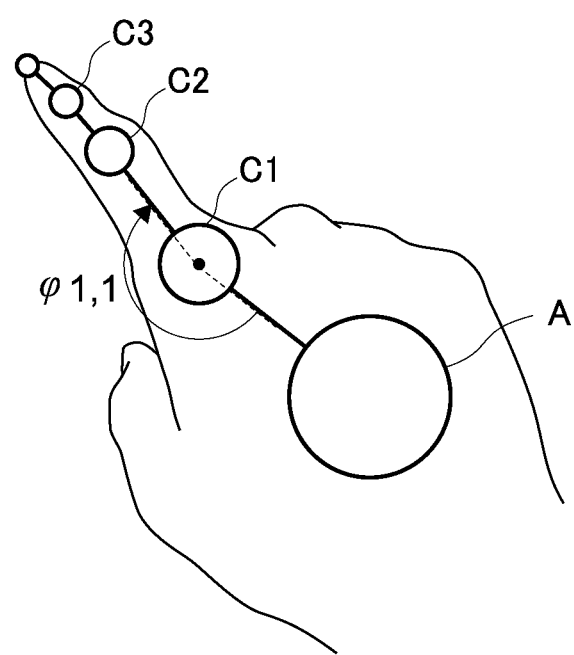
FIG. 10 A diagram for describing a swing of a user's finger to the left or the right, which can be detected by the motion-detecting device of the glove type.

There is a motion-detecting device 30 of a glove type as the motion-detecting device 30 that detects motions of the user's hand and fingers. The motion-detecting device 30 of the glove type is configured to detect a three-dimensional position of the back of the hand, angles of bend $\theta_{1,1}$, $\theta_{1,2}$, $\theta_{1,3}$ of the respective joints (first joint, second joint, and third joint) of the finger as shown in FIG. 9, further the angle of swing $\phi_{1,1}$ of the finger to the left or the right as shown in FIG. 10, and the like by means of sensors provided to the glove body. Further, the user's hand(s) or finger(s) may be imaged by a camera and similar detection may be performed by performing image processing.

Figure 11:
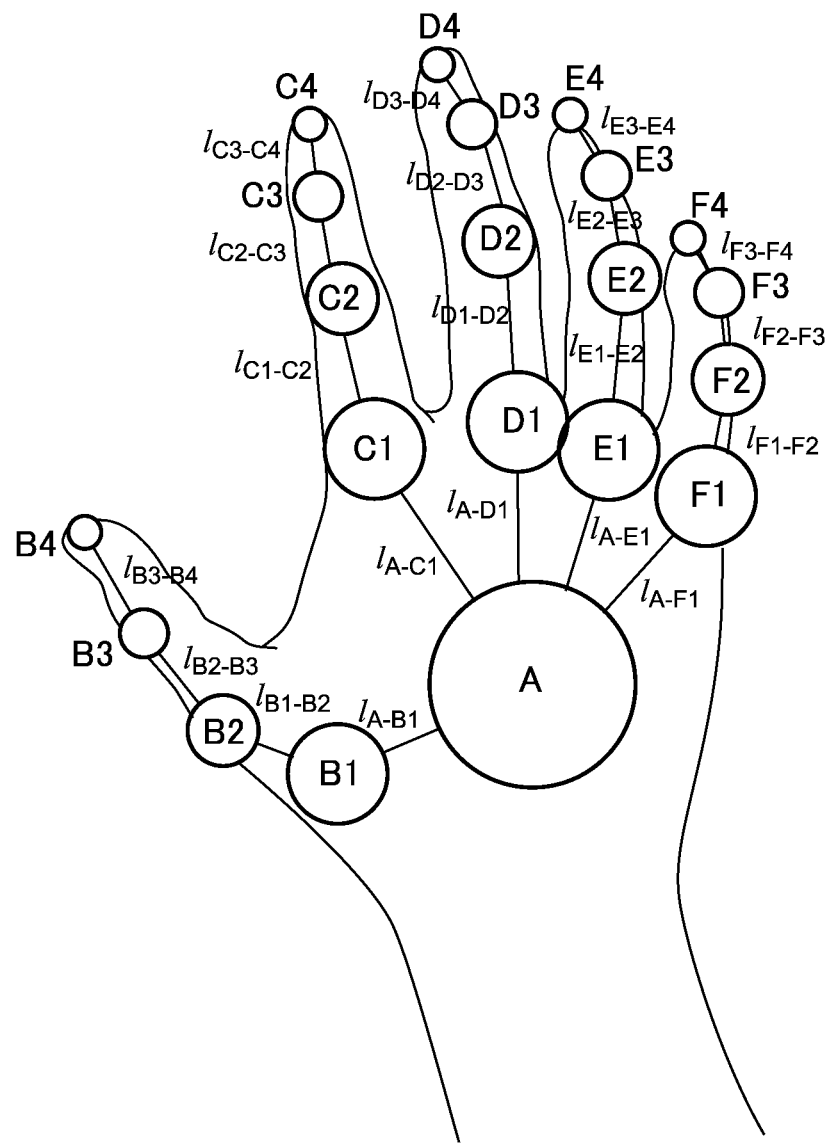
FIG. 11 A diagram for describing a plurality of operation elements which can be displayed in the virtual space on the basis of motion information detected by the motion-detecting device of the glove type.

FIG. 11 is a diagram showing a connection relationship between the plurality of operation elements displayed in the virtual space on the basis of motion information detected by using such a motion-detecting device 30 of the glove type.

Here, A is an operation element corresponding to the back of the hand. B1-B4 are operation elements respectively corresponding to the positions of the first joint, the second joint, the third joint, and the finger tip of the thumb. C1-C4 are operation elements respectively corresponding to the positions of the first joint, the second joint, the third joint, and the finger tip of the index finger. D1-D4 are operation elements respectively corresponding to the positions of the first joint, the second joint, the third joint, and the finger tip of the middle finger. E1-E4 are operation elements respectively corresponding to the positions of the first joint, the second joint, the third joint, and the finger tip of the ring finger. F1-F4 are operation elements respectively corresponding to the positions of the first joint, the second joint, the third joint, and the finger tip of the little finger.

For example, in a case where a finger used for the operation is, for example, the index finger, the operation element A corresponding to the back of the hand and the operation elements C1-C4 respectively corresponding to the first joint, the second joint, the third joint, and the finger tip of the index finger are displayed in the virtual space. A group of the plurality of operation elements A and C1-C4 to be used for the operation and displayed in the virtual space in this manner will be referred to as an "operation element set".

Figure 12:
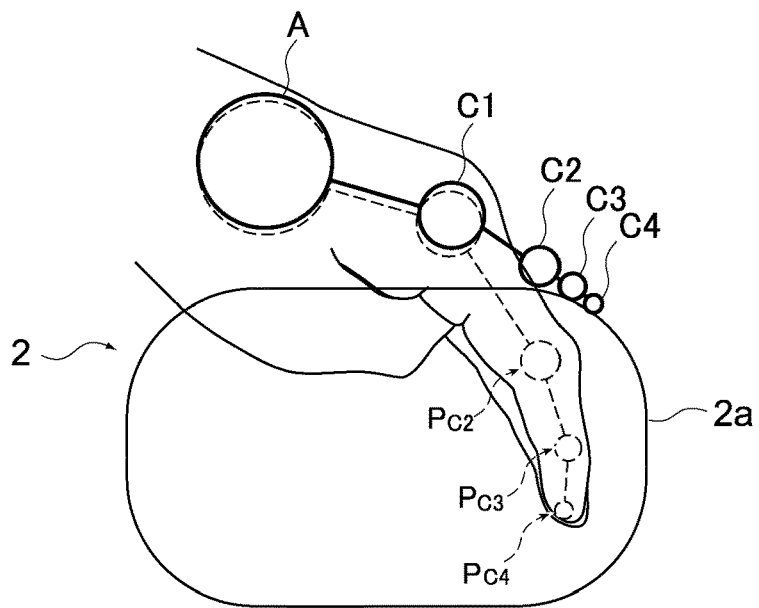
FIG. 12 A diagram describing a problem of display control for preventing penetration of the plurality of operation elements.

In a case of the method in which the operation element set is displayed in the virtual space in this manner, one or more operation elements C2, C3, and C4 whose calculation positions are located inside the object 2 are displayed from calculation positions $P_{C2}$, $P_{C3}$, and $P_{C4}$ respectively shown by the dotted lines to display positions respectively shown by the solid lines for example, as shown in FIG. 12, by individually performing the above-mentioned display control for preventing penetration of the operation element on each of the one or more operation elements C2, C3, and C4. In this case, the operation elements C2, C3, and C4 are displayed at the positions ignoring the lengths between the operation elements of the finger. Therefore, the finger appears to be shorter, for example, which is unnatural.

In order to solve this problem, the control unit 101 performs the display control for preventing penetration of the operation elements while keeping the lengths prescribed between the operation elements of the operation element set, which are adjacent to each other. For example, in a case where the finger used in the operation is the index finger, the control unit 101 performs the display control for preventing penetration of the respective operation elements C2, C3, and C4 on the operation element A of the back of the hand and the respective operation elements C1-C4 of the first joint, the second joint, the third joint, and the finger tip of the index finger while keeping lengths $1_{A\text{-}C1}$, $1_{C2\text{-}C3}$, and $1_{C3\text{-}C4}$ prescribed between those adjacent to each other.

Note that regarding the operation element set, the lengths prescribed between the operation elements adjacent to each other differ in a manner that depends on the kinds of the fingers.

Figure 13:
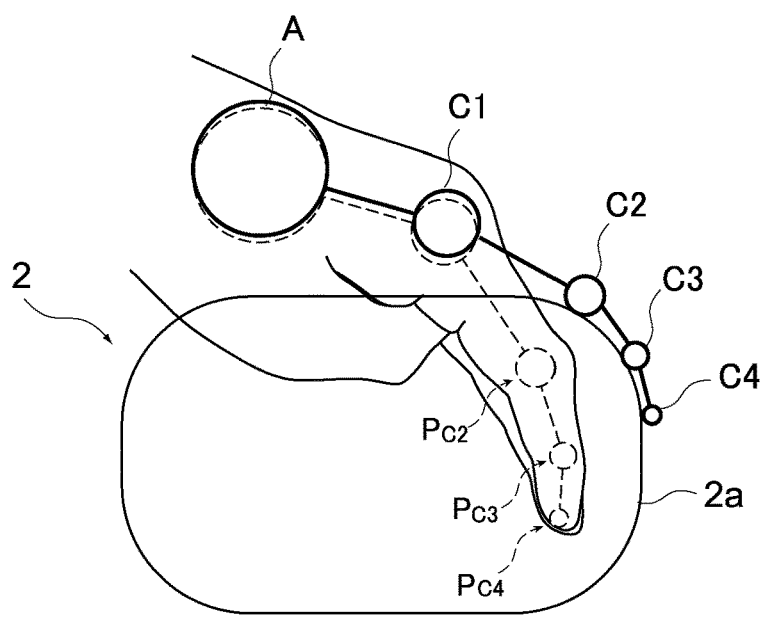
FIG. 13 A diagram for describing display control for preventing penetration of the operation elements in which lengths between the operation elements are restricted.

In this manner, in accordance with the display control for preventing penetration of the operation elements in which the lengths between the operation elements are restricted, the operation elements C2, C3, and C4, which are positioned inside the object 2 on the basis of calculation, are each displayed in a natural position relationship as shown in FIG. 13, for example, and a visual discomfort of the entire operation element set is overcome.

Figure 14:
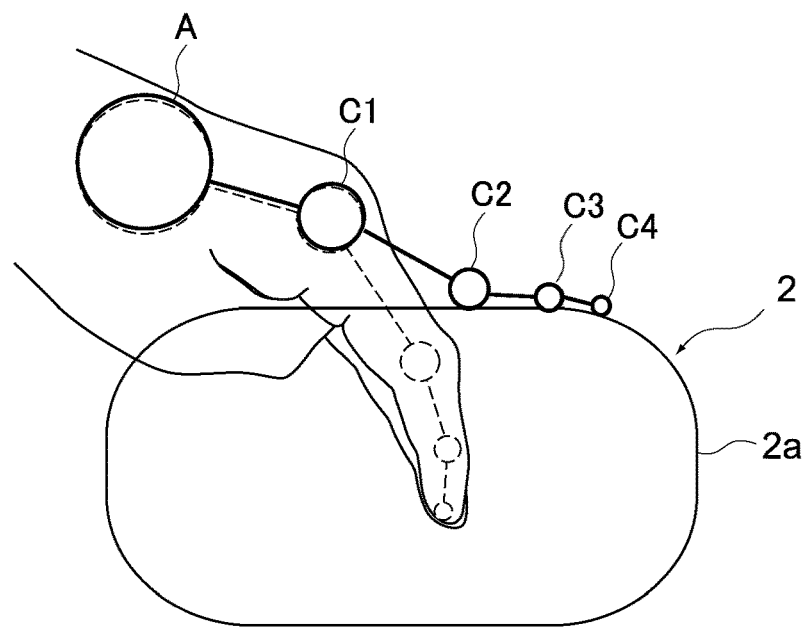
FIG. 14 A diagram for describing a problem of the display control for preventing penetration of the operation elements in which the lengths between the operation elements are restricted.

It should be noted that in the display control for preventing penetration of the operation element in which only the lengths between the operation elements are restricted as the condition, the visual discomfort may remain in a manner that depends on the shape of the object 2. For example, as shown in FIG. 14, in a case where the respective operation elements C2, C3, and C4 are displayed along a straight line of the outline 2a of the object 2 as a result of the display control for preventing penetration of the operation elements in which the lengths between the operation elements are restricted, the operation element C2 corresponding to the second joint is bent in an impossible direction, which provides an unnatural appearance.

In view of this, it is more desirable to perform the display control for preventing penetration of the operation elements under a condition where the direction of bend and the range of the angle of bend of the joint are restricted in addition to the condition regarding the lengths between the operation elements. The direction of bend and the range of the angle of bend of the joint differ in a manner that depends on the positions of the joints (first joint, second joint, and third joint) and also differ in a manner that depends on the kinds of the fingers. For example, it is possible to bend the first joint upward and downward with respect to the height of the palm. Inversely, it is difficult to bend the second joint and the third joint toward the back of the hand while it is possible to bend the second joint and the third joint toward the palm. Considering those characteristics of the respective joints, the direction of bend and the range of the angle of bend of each joint are set in advance in addition to the lengths between the operation elements as a restriction condition of the display control for preventing penetration of the operation elements.

Next, an operation of the display control for preventing penetration of the plurality of operation elements under the above-mentioned restriction condition will be described.

[9. Display Control Part I for Preventing Penetration of Plurality of Operation Elements under Restriction Condition]

Figure 15:
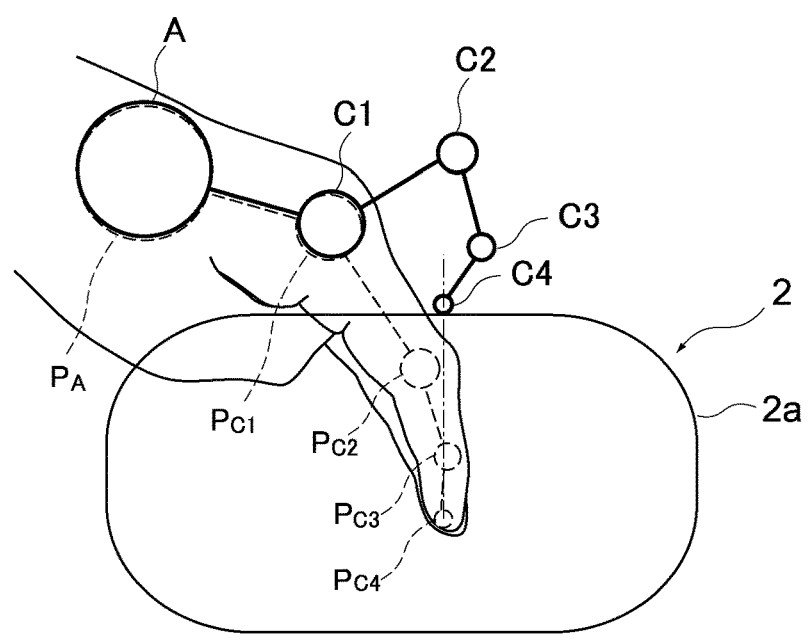
FIG. 15 A diagram for describing display control Part I for preventing penetration of the plurality of operation elements in which the lengths between the operation elements and a bent form between the joints are restricted.

FIG. 15 is a diagram for describing display control Part I for preventing penetration of the plurality of operation elements under the above-mentioned restriction condition.

On the basis of the motion information acquired from the motion-detecting device 30, the control unit 101 first calculates calculation positions $P_A$, $P_{C1}$, and $P_{C4}$ of the plurality of operation elements A, C1, and C4 respectively corresponding to the back of the hand, the first joint of the index finger, and the finger tip of the index finger.

Next, the control unit 101 calculates display positions of respective operation elements A, C1, and C4 with respect to the calculated respective calculation positions $P_A$, $P_{C1}$, and $P_{C4}$ in accordance with <5. Display Control for Preventing Penetration of Operation Element> described above. At this time, the calculation positions $P_A$ and $P_{c1}$ of the respective operation elements A and C1 of the back of the hand and the first joint of the index finger are outside the object 2. Therefore, the operation element A of the back of the hand and the operation element C1 of the first joint of the index finger are displayed at those calculation positions $P_A$ and $P_{C1}$. On the other hand, the calculation position $P_{C4}$ of the operation element C4 of the finger tip is located inside the object 2. Therefore, the operation element C4 corresponding to the finger tip is displayed at a position at which the operation element C4 corresponding to the finger tip is externally tangent to the outline 2a of the object 2 in accordance with <5. Display Control for Preventing Penetration of Operation Element> described above.

Subsequently, while fixing the display positions of the operation elements A, C1, and C4, the control unit 101 generates positions of the respective operation elements C2 and C3 of the second joint and the third joint under the above-mentioned restriction condition, not relying on <5. Display Control for Preventing Penetration of Operation Element> described above.

If the control unit 101 cannot generate display positions of the operation elements C2 and C3 of the second joint and the third joint under the restriction condition while fixing the display positions of the respective operation elements A, C1, and C4 of the back of the hand, the first joint, and the finger tip, the control unit 101, for example, adjusts the display position of one or more operation elements of the respective operation elements A, C1, and C4 of the back of the hand, the first joint, and the finger tip under the above-mentioned restriction condition, to thereby finally generate the display positions of all the operation elements A and C1-C4 under the above-mentioned restriction condition.

In the above-mentioned manner, it is possible to perform the penetration-preventing processing on the operation element set including the plurality of operation elements imitating the forms of the user's hand and fingers without destroying the natural forms.

[10. Display Control Part II for Preventing Penetration of Plurality of Operation Elements Under Restriction Condition]

Figure 16:
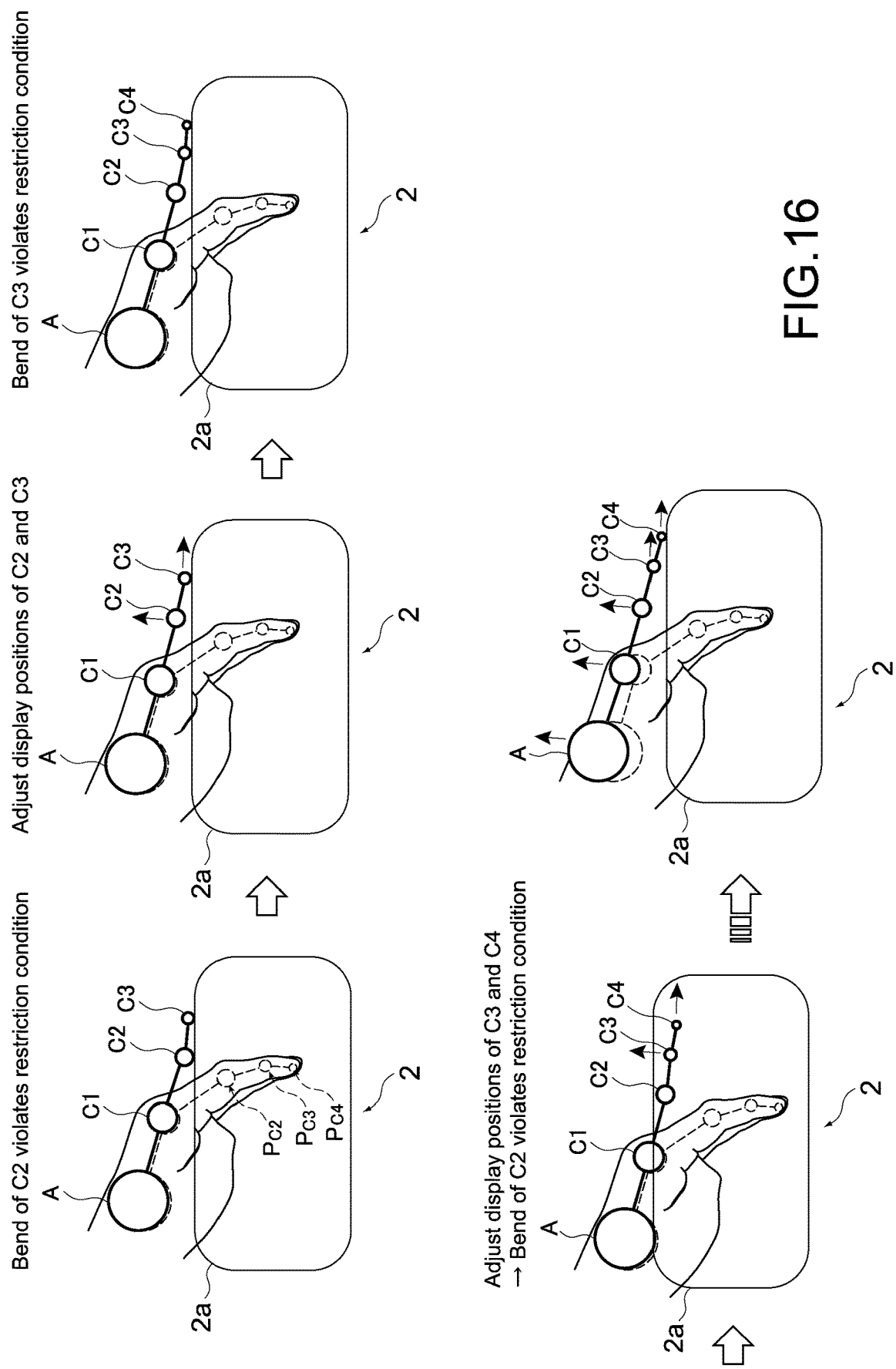
FIG. 16 A diagram for describing display control Part II for preventing penetration of the plurality of operation elements in which the lengths between the operation elements and the bent form between the joints are restricted.

FIG. 16 is a diagram for describing display control Part II for preventing penetration of the plurality of operation elements under the above-mentioned restriction condition.

On the basis of the motion information acquired from the motion-detecting device 30, the control unit 101 first searches for an operation element whose calculation position is located inside the object 2 in the order of the operation element A of the back of the hand, the operation element C1 of the first joint, the operation element C2 of the second joint, the operation element C3 of the third joint, and the operation element C4 of the finger tip. When finding the operation element whose calculation position is located inside the object 2, the control unit 101 calculates a display position that is a change destination of that operation element in accordance with the display control for preventing penetration of the operation elements under the restriction condition regarding the lengths between the operation elements.

Next, the control unit 101 determines whether or not the display position that is the change destination of that operation element leads to violation of the restriction condition regarding a bent form of the corresponding joint. If the display position that is the change destination of that operation element leads to violation of the restriction condition, the control unit 101 adjusts the display positions of one or more operation elements which affect the bent form of the corresponding joints while following the restriction condition regarding the lengths between the operation elements, searches for a display position of another change destination that does not lead to violation of the restriction condition, and performs control to display the operation element at that position.

In the example of FIG. 16, the control unit 101 determines that the display position of the operation element C3 of the third joint leads to violation of the restriction condition regarding the bent form of the operation element C2 of the second joint. In view of this, the control unit 101 adjusts each of the display positions of the operation element C2 of the second joint and the operation element C3 of the third joint, which are the operation elements that affect the bent form of the operation element C2 of the second joint, while following the restriction condition regarding the lengths between the operation elements.

In the example of FIG. 16, thereafter, the control unit 101 determines that the display position of the operation element C4 of the finger tip leads to violation of the restriction condition regarding the bent form of the operation element C3 of the third joint. In the above-mentioned manner, the control unit 101 adjusts the display position of the operation element C3 of the third joint and the display position of the operation element C4 of the finger tip, which are the operation elements that affect the bent form of the operation element C3 of the third joint, while following the restriction condition regarding the lengths between the operation elements.

Further, due to the re-adjustment of the position of the operation element C3 of the third joint, there is a possibility that violation of the restriction condition regarding the bent form of the operation element C2 of the second joint occurs again. In a case where violation of the restriction condition regarding the bent form of the operation element C2 of the second joint occurs again, the control unit 101 re-adjusts the respective display positions of the operation element C2 of the second joint, the operation element C3 of the third joint, and the operation element C4 of the finger tip while following the restriction condition regarding the lengths between the respective operation elements.

In addition, in a case where the restriction condition violation of the bent form of the operation element C1 of the first joint occurs again due to this adjustment, the control unit 101 re-adjusts the respective display positions of the operation element C1 of the first joint, the operation element C2 of the second joint, the operation element C3 of the third joint, and the operation element C4 of the finger tip while following the restriction condition regarding the lengths between the respective operation elements.

In a case where the restriction condition violation of the bent form of the operation element A1 of the back of the hand occurs due to this adjustment, the control unit 101 re-adjusts the respective display positions of the operation element A of the back of the hand, the operation element C1 of the first joint, the operation element C2 of the second joint, the operation element C3 of the third joint, and the operation element C4 of the finger tip while following the restriction condition regarding the lengths between the respective operation elements.

In the above-mentioned manner, also in accordance with this display control Part II for preventing penetration of the operation elements, it is possible to perform the penetration-preventing processing on the operation element set including the plurality of operation elements imitating the forms of the user's hand and fingers without destroying the natural forms.

In a case where the operation to space the operation element set away from the object 2 is performed, the control unit 101 individually calculates, with respect to each of the operation elements belonging to that operation element set, the display position of the operation element 3 in the external space of the object 2 such that the calculation position and the display position of the operation element gradually become the same.

Alternatively, while adjusting the position relationship between the plurality of operation elements of the operation element set under the condition where the lengths between the operation elements and the range of the bending direction and the angle of bend of the joints are restricted, the control unit 101 may calculate a display position of each of the operation elements in the external space of the object 2 such that the calculation position and the display position of the operation element gradually become the same.

Modified Example 1

Hereinabove, the display control for preventing penetration of the operation element, which presents the natural appearance when the user touches the object in the virtual space by means of the operation element by performing control to display the operation element at the position at which the operation element is externally tangent to the object when the calculation position of the operation element is located inside the object, and the display control that improves the visual responsiveness of the operation to space the operation element away from the object have been described. However, the following modifications are also conceivable in association with those processing and control.

As the motion-detecting device, a motion-detecting device including a tactile sense-presenting element such as a piezoelectric element may be used. In accordance with the display control for preventing penetration of the operation element, the control unit drives the tactile sense-presenting element to present a sense of touching the object to the user when the operation element in the virtual space is externally tangent to the object. At this time, by using a distance between the calculation position and the display position of the operation element in the virtual space as an amount of penetration, the control unit performs control such that the tactile sense-presenting element is driven at stimulation strength depending on this amount of penetration. Accordingly, assuming that some control is performed on the object by using the amount of penetration as a parameter, the amount of penetration is fed back to the user in a manner that depends on the strength of tactile sense. Thus, the usability for the user is improved.

In the tactile-sense presentation, the strength of tactile sense stimulation, the pattern, and the like may be changed in a manner that depends on the kinds of objects (kinds of articles), attributes (materials, hardness, surface properties), and the like. In addition, in a case where it is possible to give attributes (materials, hardness, surface properties) to the operation element, the control unit may perform control to present tactile senses that differ in a manner that depends on combinations of attributes of the operation element and attributes of the object, to the user. Alternatively, in a case where one object includes a plurality of sites having different attributes, by performing tactile-sense presentation corresponding to an attribute of a site touched by means of the operation element, the user can know the site touched by means of the operation element through a tactile sense.

As the method of presenting the amount of penetration to the user, there is a method of reflecting the amount of penetration on the display itself of the object other than the method of using the tactile sense. The method of reflecting the amount of penetration on the display of the object includes, for example, methods of changing the shape, size, color, texture, transparency, and luminance value of the object and the like. Also those methods, it is also possible to change how to reflect the amount of penetration on the display of the object in accordance with respective attributes of the object and the operation element.

Further, a threshold of the amount of penetration may be set to the object or the operation element and if the amount of penetration exceeds the threshold, the display position of the operation element may be set to a position inside the object, the position corresponding to the amount of penetration.

Modified Example 2

As the display control on the operation element in the case where the operation to space the operation element away from the object is performed, it has been assumed that in the first embodiment, the display position of the operation element starts to be spaced away from the object at the same time when the operation to space the operation element away from the object is started in the case where the calculation position of the operation element is located inside the object.

The start timing of the operation to space the operation element away from the object and the timing at which the display position of the operation element is spaced away from the object may be made different from each other in a manner that depends on, for example, attributes (materials, hardness, surface properties) given to the object, attributes (materials, hardness, surface properties) given to the operation element 3, and the like. More specifically, in a case where adhesiveness is given to the object or the operation element as the surface attribute, control may be performed such that the display position of the operation element starts to be spaced way from the object after a time difference (delay time) from the start of the operation to space the operation element away from the object, as if the adhesive force acted between the contact surface between both when the operation element is spaced away from the object.

Modified Example 3

In the first embodiment, the display position of the operation element is moved such that the display position of the operation element gradually approaches, every calculation cycle, the calculation position of the operation element from the position at which the display position of the operation element is externally tangent to the outline of the object, and finally becomes the same as the calculation position of the operation element. Here, a moving form between the time at which the operation to space the operation element away from the object is started and the time at which the display position and the calculation position of the operation element become the same depends on the control parameters $\alpha$ and $\beta$ of Expression (2) above, and the control parameters $\alpha$ and $\beta$ depend on the magnitude $|v|$ and the angle $|\theta_v|$ of the movement vector.

In view of this, a user interface for receiving selection or setting of details of the dependent relationship between the control parameters $\alpha$ and $\beta$ and the magnitude M and the angle $|\theta_v|$ of the movement vector from the user may be provided. Accordingly, the user can select a desired moving form as the moving form of the display position of the operation element with respect to the operation to space the operation element away from the object.

Modified Example 4

In a case where at least one of the object and the operation element has a surface property of being slippery, it is also possible to estimate an amount of movement of the operation element due to slip in contact of both and move the display position of the operation element, which results from the display control for preventing penetration of the operation element, by a distance corresponding to the movement caused by that slip.

Modified Example 5

In a case of performing control to display a plurality of operation elements according to the form of a hand in the virtual space, the scales of the plurality of operation elements may be changed on the basis of a command provided from the user through the motion-detecting device. In accordance with the changed scales of the operation elements, the control unit performs the display control for preventing penetration of the operation elements and the display control on the operation element with respect to the operation to space the operation element away from the object.

Modified Example 6

When the display control for preventing penetration of the operation element is started, force may be fed back to the user by using a force sense-presenting device. Accordingly, the user can be made to feel as if the display position of the operation element had moved in a direction opposite to the direction in which the operation element had actually moved from the calculation position.

Modified Example 7

The display control for preventing penetration of the operation element and the display control with respect to the operation to space the operation element away from the object according to the present disclosure may be controlled to be invalid if the object is hidden at the back of another object, for example, that is, if the displayed object is out of the field of view of the user on the screen. Accordingly, unnecessary computation is not performed by the CPU of the control unit, and thus the load of the CPU can be reduced.

Modified Example 8

Although in the display control for preventing penetration of the operation element, the operation element is displayed at the position at which the operation element is externally tangent to the object, the operation element may be displayed at a position at which the operation element is proximate to the object.

Further, the display control with respect to the operation to space the operation element away from the object according to the technology of the present disclosure is not necessarily limited to the use combined with the display control for preventing penetration of the operation element described in the first embodiment or the display control for preventing penetration of the plurality of operation elements described in the second embodiment.

For example, a method in which the operation element is displayed at a position at which the operation element enters the object such that the operation element is externally tangent to or is in the proximity of the object may be combined with the display control with respect to the operation to space the operation element away from the object according to the technology of the present disclosure.

Alternatively, a method in which the operation element is displayed at a position closest to the calculation position of the operation element inside the object such that the operation element is externally tangent to or is in the proximity of the object may be combined with the display control with respect to the operation to space the operation element away from the object according to the technology of the present disclosure.

The technology of the present disclosure is not limited to the field of virtual reality (VR), and is also effective in the field of augmented reality (AR).

Although the favorable embodiments of the present disclosure have been described in detail with reference to the accompanying drawings, the technical range of the present disclosure is not limited to those examples. It is obvious that a person having ordinary skill in the field of the technology of the present disclosure can conceive various variant or modification examples without departing from the range of technical ideas described in the scope of claims and it should be appreciated that those also fall within the technical range of the present disclosure.

It should be noted that the present technology may also take the following configurations. (1) An information processing apparatus, including:

a display control unit that generates display information for controlling a display device to display
 a first virtual object defined in a virtual space, and
 a second virtual object different from the first virtual object; and
a controller that is configured to
 control the display device to move the first virtual object in the virtual space on the basis of a reference position based on an operation input of a user,
 control, when determining that the reference position of the first virtual object is located inside the second virtual object, the display device to display the first virtual object at a position at which the first virtual object is externally tangent to the second virtual object, and
 control, when determining that an operation to space the first virtual object away from the second virtual object is performed, a display position of the first virtual object such that the reference position and the display position of the first virtual object gradually become the same in association with the operation.

(2) The information processing apparatus according to (1), in which
 the controller is configured to
 calculate, on the basis of a movement vector of the reference position of the first virtual object and a difference vector between the reference position of the first virtual object and the display position of the first virtual object, an amount of control for updating the display position of the first virtual object, which is associated with the operation to space the first virtual object away from the second virtual object.

(3) The information processing apparatus according to (1) or (2), in which
 the first virtual object includes a plurality of first virtual objects, and
 the controller is configured to
 control, when the reference position of at least one first virtual object of the plurality of first virtual objects in the virtual space is located inside the second virtual object in a case where the plurality of first virtual objects are displayed in the virtual space on the basis of the reference position based on the operation input of the user, the display device to display the at least one first virtual object at a position at which the at least one first virtual object is externally tangent to the second virtual object under a restriction condition of a relative position relationship prescribed between the plurality of first virtual objects.

(4) The information processing apparatus according to (3), in which
the controller is configured to
control the display positions of the plurality of first virtual objects such that the reference position of the first virtual object and the display position of the first virtual object gradually become the same while following the restriction condition in association with an operation to space the plurality of first virtual objects away from the second virtual object.

(5) The information processing apparatus according to (1) or (2), in which
the controller is configured to
control, when determining the operation to move the first virtual object at a position inside the second virtual object, the display device to display the first virtual object at a position at which the first virtual object is externally tangent to the second virtual object in a movement process of the first virtual object.

(6) The information processing apparatus according to (1) or (2), in which
the controller is configured to
when determining that an operation to move the first virtual object to a first position inside the second virtual object from outside the second virtual object,
control the display device to display the first virtual object at a second position at which the first virtual object is externally tangent to the second virtual object in a process where the first virtual object is moved to the first position inside the second virtual object,
determine a first normal direction with respect to an outline of the second virtual object to which the first virtual object displayed at the second position is externally tangent,
determine a second normal direction with respect to the outline of the second virtual object, the second normal direction extending in the first normal direction from the first position,
update the display position of the first virtual object to a third position at which the display position of the first virtual object is externally tangent to the outline of the second virtual object, the third position being located in the second normal direction extending from the first position, and
repeat processing for updating the display position of the first virtual object until the processing for updating the display position of the first virtual object ends.

(7) An information processing method, including:
generating, by a display control unit, display information for controlling a display device to display a first virtual object defined in a virtual space, and a second virtual object different from the first virtual object; and
by a controller,
controlling the display device to move the first virtual object in the virtual space on the basis of a reference position based on an operation input of a user, controlling, when determining that the reference position of the first virtual object is located inside the second virtual object, the display device to display the first virtual object at a position at which the first virtual object is externally tangent to the second virtual object, and controlling, when determining that an operation to space the first virtual object away from the second virtual object is performed, a display position of the first virtual object such that the reference position and the display position of the first virtual object gradually become the same in association with the operation.

(8) The information processing method according to (7) in which,
the controller calculates, on the basis of a movement vector of the reference position of the first virtual object and a difference vector between the reference position of the first virtual object and the display position of the first virtual object, an amount of control for updating the display position of the first virtual object, which is associated with the operation to space the first virtual object away from the second virtual object.

(9) The information processing method according to (7) or (8) in which
the first virtual object includes a plurality of first virtual objects, and
the controller controls, when the reference position of at least one first virtual object of the plurality of first virtual objects in the virtual space is located inside the second virtual object in a case where the plurality of first virtual objects are displayed in the virtual space on the basis of the reference position based on the operation input of the user, the display device to display the at least one first virtual object at a position at which the at least one first virtual object is externally tangent to the second virtual object under a restriction condition of a relative position relationship prescribed between the plurality of first virtual objects.

(10) The information processing method according to (9), in which
the controller controls the display positions of the plurality of first virtual objects such that the reference position of the first virtual object and the display position of the first virtual object gradually become the same while following the restriction condition in association with an operation to space the plurality of first virtual objects away from the second virtual object.

(11) The information processing method according to (7) or (8), in which
the controller controls, when determining the operation to move the first virtual object at a position inside the second virtual object, the display device to display the first virtual object at a position at which the first virtual object is externally tangent to the second virtual object in a movement process of the first virtual object.

(12) The information processing method according to (7) or (8), in which
the controller
when determining that an operation to move the first virtual object to a first position inside the second virtual object from outside the second virtual object,
controls the display device to display the first virtual object at a second position at which the first virtual object is externally tangent to the second virtual object in a process where the first virtual object is moved to the first position inside the second virtual object,
determines a first normal direction with respect to an outline of the second virtual object to which the first virtual object displayed at the second position is externally tangent,
determines a second normal direction with respect to the outline of the second virtual object, the second normal direction extending in the first normal direction from the first position,
updates the display position of the first virtual object to a third position at which the display position of the first virtual object is externally tangent to the outline of the second virtual object, the third position being located in the second normal direction extending from the first position, and repeats processing for updating the display position of the first virtual object until the processing for updating the display position of the first virtual object ends.

(13) A program that causes a computer to operate as:
a display control unit that generates display information for controlling a display device to display
a first virtual object defined in a virtual space, and
a second virtual object different from the first virtual object; and
a controller that is configured to
control the display device to move the first virtual object in the virtual space on the basis of a reference position based on an operation input of a user,
control, when determining that the reference position of the first virtual object is located inside the second virtual object, the display device to display the first virtual object at a position at which the first virtual object is externally tangent to the second virtual object, and
control, when determining that an operation to space the first virtual object away from the second virtual object is performed, a display position of the first virtual object such that the reference position and the display position of the first virtual object gradually become the same in association with the operation.

(14) The program according to (13), in which
the computer operates as the controller that calculates, on the basis of a movement vector of the reference position of the first virtual object and a difference vector between the reference position of the first virtual object and the display position of the first virtual object, an amount of control for updating the display position of the first virtual object, which is associated with the operation to space the first virtual object away from the second virtual object.

(15) The program according to (13) or (14), in which
the first virtual object includes a plurality of first virtual objects, and
the computer operates as the controller that controls, when the reference position of at least one first virtual object of the plurality of first virtual objects in the virtual space is located inside the second virtual object in a case where the plurality of first virtual objects are displayed in the virtual space on the basis of the reference position based on the operation input of the user, the display device to display the at least one first virtual object at a position at which the at least one first virtual object is externally tangent to the second virtual object under a restriction condition of a relative position relationship prescribed between the plurality of first virtual objects.

(16) The program according to (15), in which
the computer operates as the controller that controls the display positions of the plurality of first virtual objects such that the reference position of the first virtual object and the display position of the first virtual object gradually become the same while following the restriction condition in association with an operation to space the plurality of first virtual objects away from the second virtual object.

(17) The program according to (13) or (14), in which
the computer operates as the controller that controls, when determining the operation to move the first virtual object at a position inside the second virtual object, the display device to display the first virtual object at a position at which the first virtual object is externally tangent to the second virtual object in a movement process of the first virtual object.

(18) The program according to (13) or (14), in which
the computer operates as the controller that
when determining that an operation to move the first virtual object to a first position inside the second virtual object from outside the second virtual object,
controls the display device to display the first virtual object at a second position at which the first virtual object is externally tangent to the second virtual object in a process where the first virtual object is moved to the first position inside the second virtual object,
determines a first normal direction with respect to an outline of the second virtual object to which the first virtual object displayed at the second position is externally tangent,
determines a second normal direction with respect to the outline of the second virtual object, the second normal direction extending in the first normal direction from the first position,
updates the display position of the first virtual object to a third position at which the display position of the first virtual object is externally tangent to the outline of the second virtual object, the third position being located in the second normal direction extending from the first position, and
repeats processing for updating the display position of the first virtual object until the processing for updating the display position of the first virtual object ends.

REFERENCE SIGNS LIST 1 information processing system
2 object
3 operation element
10 information processing apparatus
20 display device
30 motion-detecting device
101 control unit
102 operation unit
103 storage unit
104 display interface
105 input interface

The invention claimed is:
1. An information processing apparatus, comprising:
a processor configured to:
control a display device to display a first virtual object in a virtual space, and a second virtual object different from the first virtual object;
control the display device to move the first virtual object in the virtual space in accordance with a reference position based on an operation input of a user;
control, based on a determination that the reference position of the first virtual object is located inside the second virtual object, the display device to display the first virtual object at a position at which the first virtual object is externally tangent to the second virtual object; and
control, based on a determination that an operation to space the first virtual object away from the second virtual object is performed, a display position of the first virtual object such that the reference position and the display position of the first virtual object gradually become the same in association with the operation.

2. The information processing apparatus according to claim 1, wherein the processor is further configured to
calculate, based on a movement vector of the reference position of the first virtual object and a difference vector between the reference position of the first virtual object and the display position of the first virtual object, an amount of control to update the display position of the first virtual object, wherein the amount of control is associated with the operation to space the first virtual object away from the second virtual object.

3. The information processing apparatus according to claim 2, wherein
the first virtual object comprises a plurality of first virtual objects, and
the processor is further configured to
control, in a case where a reference position of at least one first virtual object of the plurality of first virtual objects in the virtual space is located inside the second virtual object and the plurality of first virtual objects are displayed in the virtual space in accordance with the reference position based on the operation input of the user, the display device to display the at least one first virtual object at a position at which the at least one first virtual object is externally tangent to the second virtual object based on a restriction condition related to a relative position between the plurality of first virtual objects.

4. The information processing apparatus according to claim 3, wherein the processor is further configured to
control a display position of each of the plurality of first virtual objects such that the reference position of each virtual object of the plurality of first virtual objects and the display position of a respective virtual object of the plurality of first virtual objects gradually become the same based on the restriction condition in association with an operation to space the plurality of first virtual objects away from the second virtual object.

5. The information processing apparatus according to claim 1, wherein the processor is further configured to
control, based on an execution of an operation to move the first virtual object at a position inside the second virtual object, the display device to display the first virtual object at the position at which the first virtual object is externally tangent to the second virtual object in a movement process of the first virtual object.

6. The information processing apparatus according to claim 1, wherein
based on an execution of an operation to move the first virtual object to a first position inside the second virtual object from outside the second virtual object, the processor is further configured to:
control the display device to display the first virtual object at a second position at which the first virtual object is externally tangent to the second virtual object in a movement process where the first virtual object is moved to the first position inside the second virtual object;
determine a first normal direction with respect to an outline of the second virtual object to which the first virtual object displayed at the second position is externally tangent;
determine a second normal direction with respect to the outline of the second virtual object, wherein the second normal direction extends in the first normal direction from the first position;
update the display position of the first virtual object to a third position at which the display position of the first virtual object is externally tangent to the outline of the second virtual object, wherein the third position is located in the second normal direction that extends from the first position; and
repeat the update of the display position of the first virtual object until the display position of the first virtual object is updated to a determined position.

7. An information processing method, comprising:
controlling, by a processor, a display device to display a first virtual object in a virtual space, and a second virtual object different from the first virtual object;
controlling, by the processor, the display device to move the first virtual object in the virtual space in accordance with a reference position based on an operation input of a user;
controlling, by the processor, based on an operation to space the first virtual object away from the second virtual object, a display position of the first virtual object such that the reference position and the display position of the first virtual object gradually become the same in association with the operation.

8. The information processing method according to claim 7, further comprising controlling, by the processor, the display device to display the first virtual object at a position at which the first virtual object is externally tangent to the second virtual object based on a determination that the reference position of the first virtual object is located inside the second virtual object.

9. The information processing method according to claim 7, further comprising calculating, by the processor, based on a movement vector of the reference position of the first virtual object and a difference vector between the reference position of the first virtual object and the display position of the first virtual object, an amount of control for updating the display position of the first virtual object, wherein the amount of control is associated with the operation to space the first virtual object away from the second virtual object.

10. The information processing method according to claim 7, wherein a time required for the operation to space the first virtual object away from the second virtual object is based on surface properties of each of the first virtual object and the second virtual object.

11. A non-transitory computer-readable medium having stored thereon, computer-executable instructions, which when executed by a processor, cause the processor to execute operations, the operations comprising:
controlling a display device to display a first virtual object in a virtual space, and a second virtual object different from the first virtual object;
controlling the display device to move the first virtual object in the virtual space in accordance with a reference position based on an operation input of a user;
controlling, based on a determination that the reference position of the first virtual object is located inside the second virtual object, the display device to display the first virtual object at a position at which the first virtual object is externally tangent to the second virtual object; and
controlling, based on a determination that an operation to space the first virtual object away from the second virtual object is performed, a display position of the first virtual object such that the reference position and the display position of the first virtual object gradually become the same in association with the operation.

* * * * *